United States Patent [19]
Wedellsborg et al.

[11] Patent Number: 5,087,409
[45] Date of Patent: Feb. 11, 1992

[54] PRESSURE VESSEL IMPROVEMENT

[76] Inventors: Bendt W. Wedellsborg; Ulrich W. Wedellsborg, both of 552 Maureen La., Pleasant Hill, Calif. 94523

[21] Appl. No.: 444,174

[22] Filed: Nov. 30, 1989

[51] Int. Cl.⁵ .......................................... G21C 13/00
[52] U.S. Cl. .................................. 376/294; 220/586
[58] Field of Search ............... 376/293, 294, 295, 296, 376/285, 286, 292; 220/3, 4.01, 415, 469; 52/223 R, 225, 227

[56] References Cited

U.S. PATENT DOCUMENTS

| | | | |
|---|---|---|---|
| 3,131,245 | 4/1964 | Lorenz | 266/34 |
| 3,282,459 | 11/1966 | Wilson | 220/3 |
| 3,445,971 | 5/1969 | Desmarchais et al. | 376/294 |
| 3,711,371 | 1/1973 | Cahill | 376/294 |
| 3,744,660 | 7/1973 | Gaines et al. | 376/294 |
| 3,910,447 | 10/1975 | Bevilacqua | 376/294 |
| 3,940,311 | 2/1976 | Frisch | 376/285 |
| 4,096,034 | 6/1978 | Anthony | 376/285 |
| 4,675,146 | 6/1987 | Sutton, Jr. | 376/250 |
| 4,767,593 | 8/1988 | Wedellsborg | 376/294 |

OTHER PUBLICATIONS

"Multilayer Pressure Vessel with Interlayer Metallic Cushions", B. W. Wedellsborg, Int. J. Pres. Ves. Piping 36 (1989) 1-20.

"Developments in Pressure Vessel Technology-4", R. W. Nichols, Chapter 4, Prestressed Cast Iron Pressure Vessels, D. Bounin and B. Beine, Applied Science Publishers, 1983.

*Primary Examiner*—Daniel D. Wasil
*Attorney, Agent, or Firm*—Robert R. Tipton

[57] ABSTRACT

A multiple shell pressure vessel is fabricated in modular sections comprising a top head module, a nozzle course module and a bottom shell module, each module utilizing telescoping shells with filled interspaces, each shell being removable for inspection and repair with all modular sections and shells being held in compression by a pair of upper and lower single or multilayer tendon skirts held in place by a number of tension members in combination with hydraulic or mechanical jacks or rams. Both tendons and rams are located outside the pressure vessel. Included is a method of arranging the shell flanges and shell radial supports to reduce or eliminate torsional forces on the flanges and flange seals. A leak detection system monitors for leaks in all shells. A method of adjusting shell stresses during operation uses pumps to adjust the pressure of the filler material in the interspaces between shells. The high thermal conductivity of the outer vessel wall, which is due to good thermal bonding provided by the intershell metallic filler-materials, makes it possible to keep the pressure-carrying outer vessel shells cool during service, by cooling the outer shell by plain water, borated water for nuclear reactor vessels, or other coolant.

11 Claims, 11 Drawing Sheets

PRESSURE VESSEL IMPROVEMENT

BACKGROUND OF THE INVENTION

This invention relates generally to pressure vessels and in particular to pressure vessels for holding high temperature material under high pressure that require periodic inspection of welds and internal structural members.

Reference is made to inventor's prior patent No. 4,767,593, for a multiple shell pressure vessel with interspace metallic fillers of which the invention disclosed and claimed herein is an improvement.

For pressure vessels containing toxic material at high pressures and temperatures, such as, nuclear reactors or containment vessels for toxic chemical reactions, safety requirements, such as those required by the American Association of Mechanical Engineers and other organizations both public and private, dictate periodic inspection and re-examination of all pressure loaded joints. The joints, such as, shell-to-flange girth welds and all other welds, must be exposed for non-destructive testing, such as, by ultra-sound, X-ray or other methods for determining soundness of a structure.

For a single wall pressure vessel of the prior art, assembly and disassembly of the vessel was fairly straightforward. All welds were generally readily available for inspection.

For a multiple-shell pressure vessel, the welded assembly of pressure vessel shells rendered it difficult, if not impossible, to gain ready access to the welded joints of the inner shells of the vessel without breaking or cutting the vessel apart.

For a single wall pressure vessel of the prior art, a crack in the shell could easily propagate through the wall causing a catastrophic failure. For a multiple shell pressure vessel, such as, the present invention, a crack in one shell-layer cannot propagate to the other layers.

For the present invention, overpressure may cause "gapping" of the modules as the tendons stretch, with subsequent "leak-before-break" failure mode. In this failure mode the vessel fluid will leak out into the external (water) coolant thus relieving the overpressure.

In addition, the prior art pressure vessels could fail due to excessive creep, or creep buckling. For the present invention, the tendons may be tightened and filler introduced in the outermost filler space, while the pressure vessel is in service, so that the main vessel shell layers will not be able to creep.

Furthermore, the single or multilayer pressure vessels of the prior art cannot be cooled through the vessel wall. Therefore, internal thermal insulation, or cooling of the internal vessel wall surface is necessary. For prior art pressure vessels, this posed an awkward problem. The insulation would be exposed to the vessel fluid and maintenance and repair was cumbersome.

For the present invention, the thermal insulation is located inside the wall and its outer surface and the outer vessel shells can be kept cool, due to good thermal bonding from metallic fillers in the interspaces between the outer pressure vessel shells, so that they can carry a larger pressure.

SUMMARY OF THE INVENTION

The multiple shell pressure vessel of the present invention eliminates these problems by comprising three modular sections, namely, a top head modular section, a nozzle course modular section and a bottom shell course modular section. The three modular sections each comprise at least an inner pressure vessel shell and an outer pressure vessel shell telescopically enclosing the inner pressure vessel shell. The rim or rims of each shell are provided with separate flanges having upper and lower bearing surfaces. When telescopically assembled, the lower bearing surface of one shell flange is adapted to engage the upper bearing surface of the adjacent shell flange or flange of an adjacent vessel module either directly or through an intermediate spacer plate or ring.

Top and bottom tendon skirts are adapted to respectively engage the outer flange of the top head modular section and the outer flange of the bottom shell course modular section and compress the bearing flanges together by means of tension members or "tendons" linking the top and bottom tendon skirts. The "tendons" are hydraulically or mechanically tensioned to create the necessary force on the vessel flanges to seal the vessel. All the tendons are located outside the vessel where they are kept cool and not subjected to heat or radiation. Being located outside the pressure vessel, the tendon stresses can be monitored during service.

It is, therefore, an object of the present invention to provide a large scale multiple shell pressure vessel that can be disassembled for inspection.

It is another object of the present invention to provide a large scale multiple shell pressure vessel that can be assembled in two or more prefabricated modules for ease of transport and assembly.

It is a further object of the present invention to provide a multiple shell pressure vessel in which the individual shells can be disassembled for inspection, testing and repair.

It is yet another object of the present invention to provide a multiple shell pressure vessel where all shells can be stressed simultaneously to their design limit during normal operation.

It is also an object of the present invention to provide a multiple shell pressure vessel which can tolerate large differences in temperature across its walls so that the inner shell layers may be very hot while the outer shell layers are kept cool in order to carry the pressure load.

It is a further object of the present invention to provide a multiple shell pressure vessel in which the hoop and axial stresses are continuously monitored.

It is another object of the present invention to provide a multiple shell pressure vessel in which the torsional forces on the flanges are reduced or eliminated.

It is yet a further object of the present invention to provide a multiple shell pressure vessel in which the hoop and axial stresses can be adjusted while the vessel is operating.

These and other objects of the present invention will be manifest upon study of the following detailed description when taken together with the drawings.

DESCRIPTION OF THE PREFERRED EMBODIMENT

Figure 1:
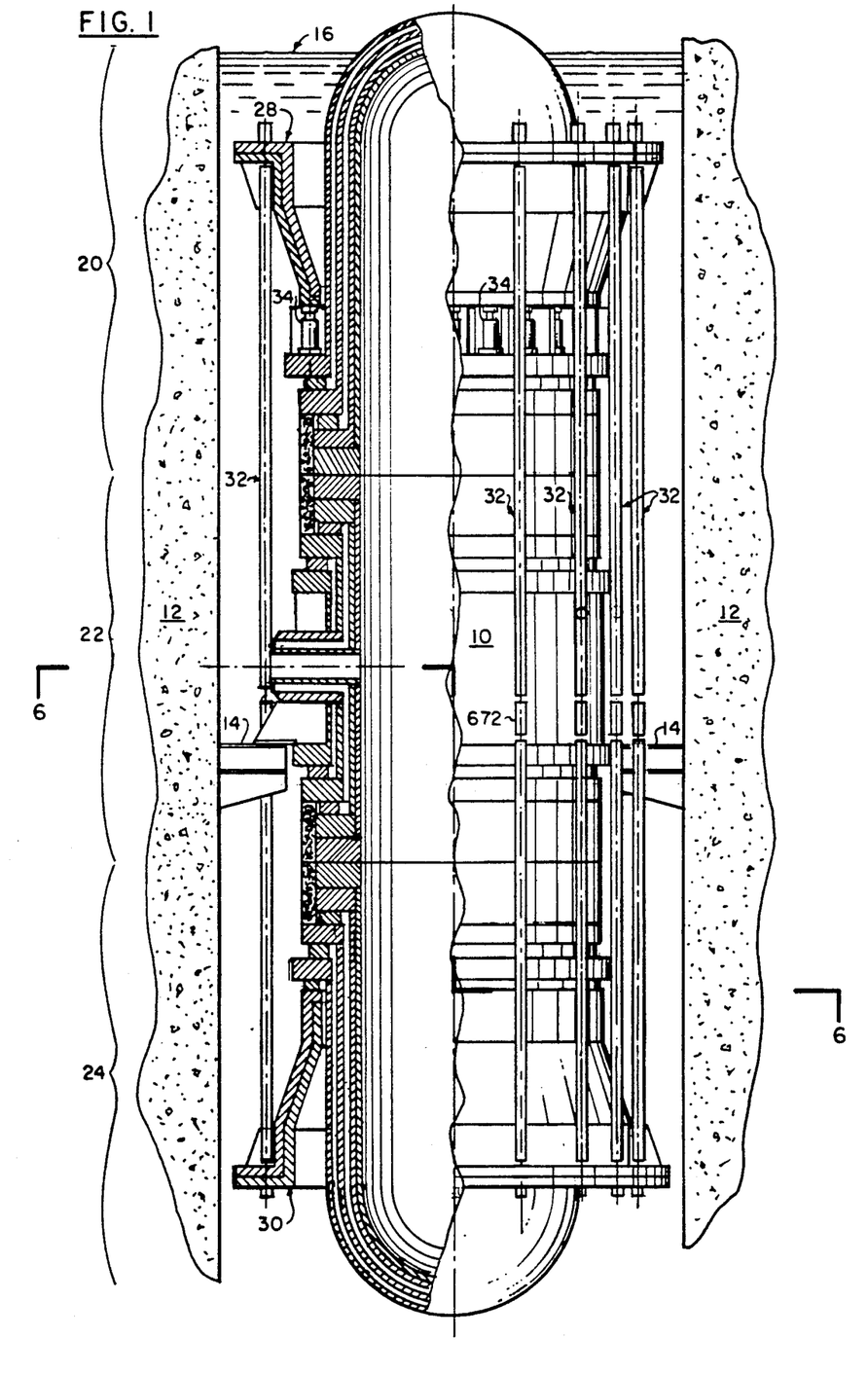
FIG. 1 is a partial sectional, elevational view of the assembled pressure vessel of the present invention.

With reference to FIG. 1 there is illustrated the assembled multiple shell pressure vessel 10 of the present invention enclosed by concrete walls 12 and supported by cantilevered beams 14.

Multiple shell pressure vessel 10 comprises, basically, a top head section or module 20, a nozzle course or section module 22 and a bottom shell course or section module 24. An upper tendon skirt 28 and a lower tendon skirt 30 are, respectively, adapted to engage top head section 20 and bottom shell modular section 24 and, in cooperation with tension members or tendons 32 and hydraulic or mechanical jacks or rams 34, to hold modules 20, 22 and 24 in compression against each other. The multiple shells or modules, consist of an inner leaktight shell-layer in which the interspace between this and the next shell may be empty, but is monitored by leak monitoring ducts 706. The outer shells carry the pressure load.

The entire pressure vessel 10 is surrounded or emersed in a coolant 16, such as, water or other fluid. For nuclear reactor pressure vessels, the fluid can be borated water.

Figure 2:
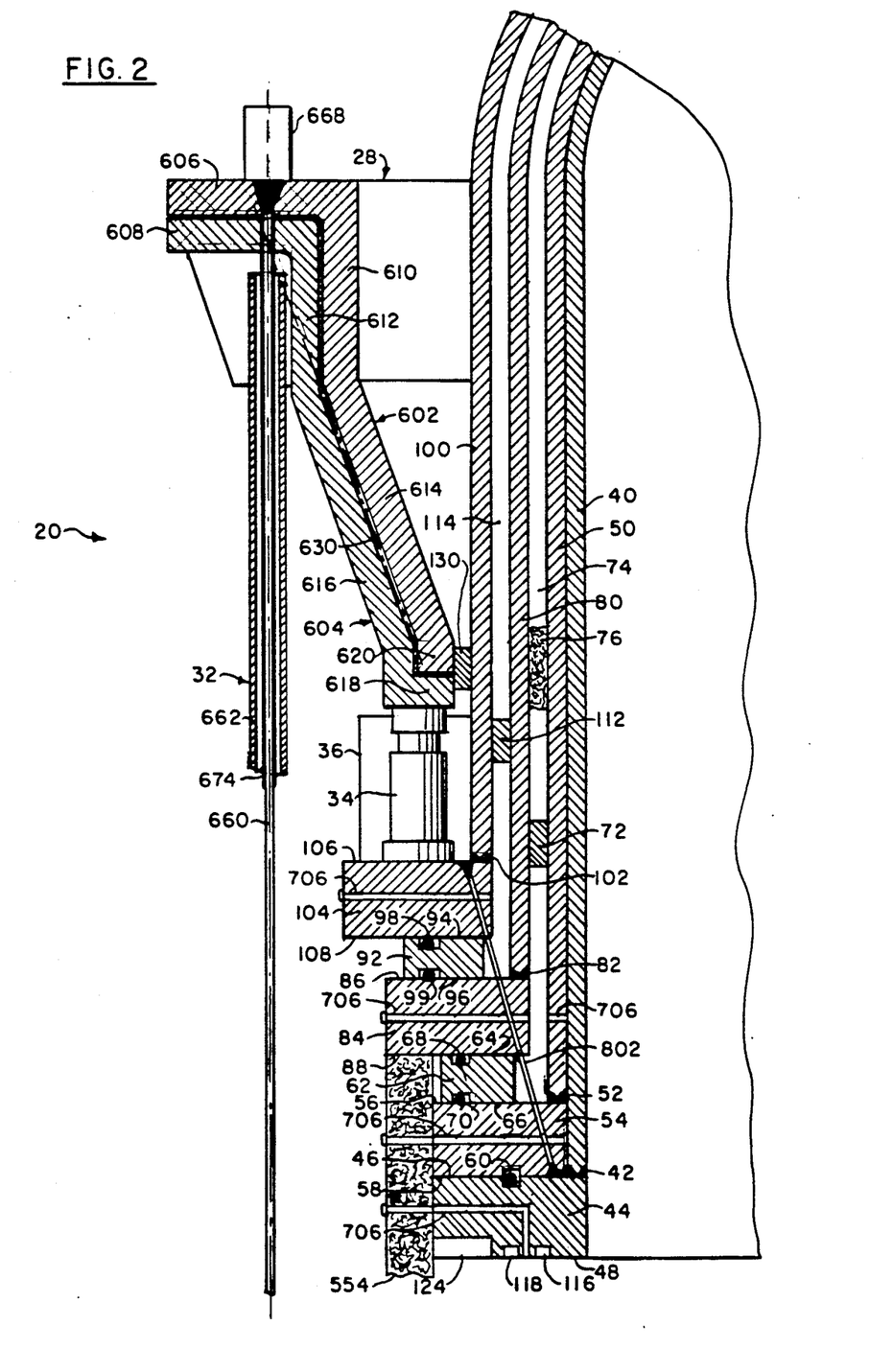
FIG. 2 is an elevational partial cross-section of the top head section module of the pressure vessel of FIG. 1.

Top Head Module:

With reference to FIG. 2 there is illustrated an enlarged elevational partial cross-section of top head section module 20 of pressure vessel 10 showing the shell and flange structure in greater detail.

Top head modular section 20 comprises, basically, a first leaktight inner top head section shell 40 having a bottom rim 42 on which is attached, as by welding or the like, first inner top head flange 44 having an upper bearing surface 46 and a lower bearing surface 48.

Top head section 20 further comprises a first intermediate shell 50 having a bottom rim 52 on which is attached, as by welding or the like, first intermediate flange 54 having an upper bearing surface 56 and a lower bearing surface 58. Lower bearing surface 58 of intermediate flange 54 is adapted to sealably engage the upper bearing surface 46 of first inner flange 44 using "O"-ring seal 60.

A first top head spacer bearing ring 62 having an upper bearing surface 64 and a lower bearing surface 66, is adapted to sealably engage top bearing surface 56 of first intermediate flange 54. Upper and lower circumferential seals 68 and 70 in spacer bearing ring 62 are adapted to maintain a leaktight seal between the flange and bearing ring surfaces.

Top head section 20 further comprises a second intermediate shell 80 having a bottom rim 82 on which is attached, as by welding or the like, second intermediate flange 84 having an upper bearing surface 86 and a lower bearing surface 88. Lower bearing surface 88 of second intermediate flange 84 is adapted to sealably engage the upper bearing surface 64 of first bearing ring 62.

Between first intermediate shell 50 and second intermediate shell 80 is first radial spacer bearing plate or ring 72 for maintaining radial spacing of the shells 50 and 80 and to provide radial support during vessel service. The location of ring 72 is determined by calculation to result in minimum torsion of the flange 54. This space 74 is filled with a high temperature insulating material 76 such as fiberglass or the like. Space 74 could also be filled with a fluid.

A second top head spacer bearing ring 92 having an upper bearing surface 94 and a lower bearing surface 96, is adapted to sealably engage top bearing surface 86 of third intermediate flange 84. Upper and lower circumferential seals 98 and 99 in spacer bearing ring 92 maintain a leaktight seal between the flange and bearing ring surfaces.

Top head section 20 further comprises a first outer shell 100 having a bottom rim 102 on which is attached, as by welding or the like, first outer flange 104 having an upper bearing surface 106 and a lower bearing surface 108. Lower bearing surface 108 of first outer flange 104 is adapted to sealably engage the upper bearing surface 94 of second bearing ring 92. Upper bearing surface 106 of first outer flange 104 is adapted to support hydraulic or mechanical jacks or rams 34. Jacks or rams 34 are adapted to engage bottom flange 618 of upper tendon skirt 28.

Between first outer shell 100 and second intermediate shell 80 is second radial spacer bearing plate or ring 112 for maintaining radial spacing of shells 80 and 100 and provide radial support during vessel service. It is located so that flange 84 will suffer minimum torsion. The exact location can be determined by calculation. This space 114 is filled with a fluid, such as, a low melting point metal in order to transmit pressure from second intermediate shell 80 to first outer shell 100.

A set of limit stops 36 are attached to top surface 106 of first outer flange 104 adjacent each ram 34 to limit the upward travel of flange 104 by engaging flange 518 of upper tendon skirt 28.

To obtain a leaktight seal between top head module 20 and nozzle course module 22, a pair of first and second "O"-ring channels 116 and 118 are provided in lower bearing surface 48 of first inner flange 44. Matching "O"-ring channels 120 and 122 are provided in top flange 244 of nozzle course module 24 (FIG. 3).

Figure 3:
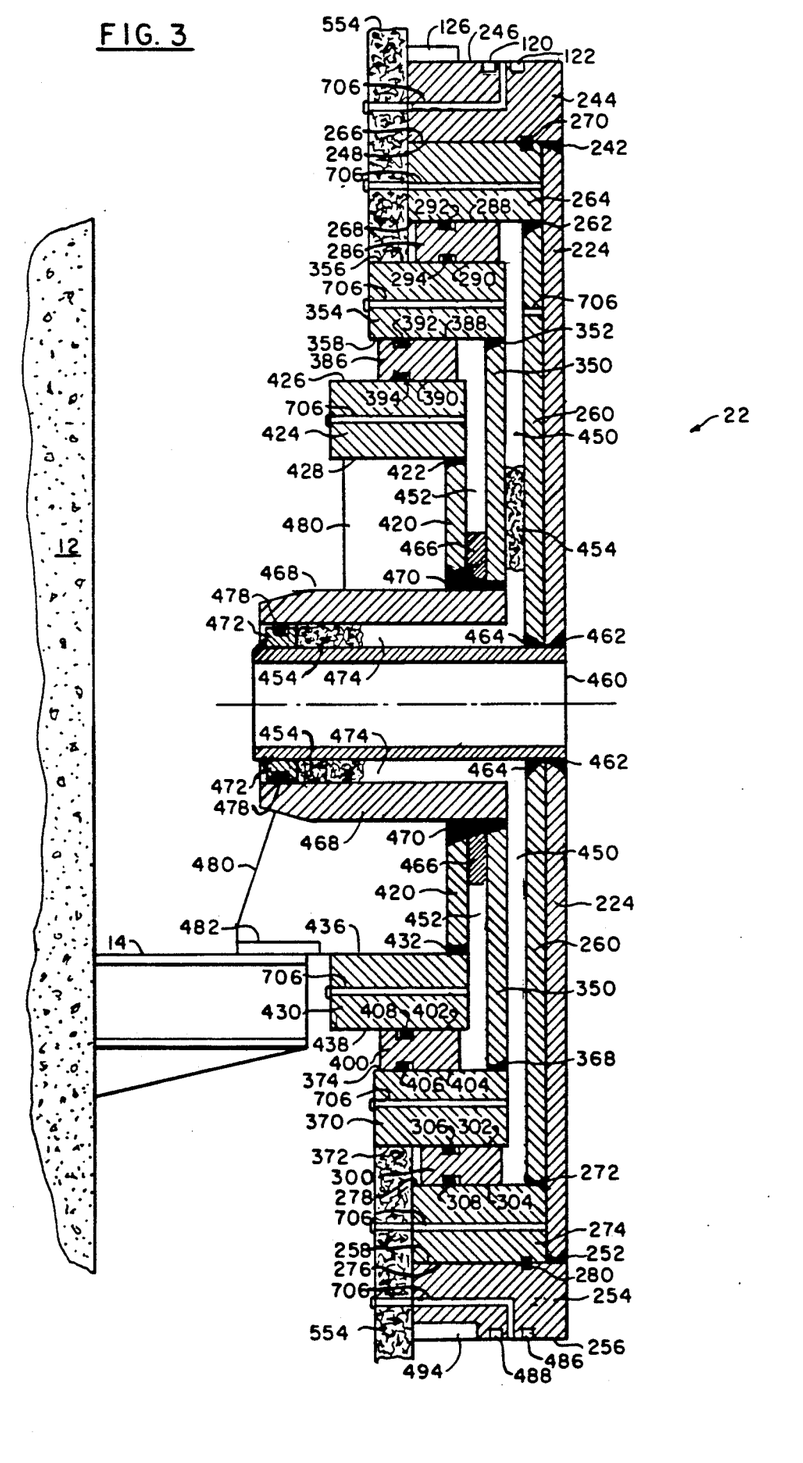
FIG. 3 is an elevational partial cross-section of the nozzle course module of the pressure vessel of FIG. 1 showing the method of penetrating the vessel wall.

In order to properly align top head module 20 with nozzle course module 22, a radial guide notch 124 is provided in lower bearing surface 48 of top head first inner flange 44 which is adapted to receive radial guide key 126 attached to the top surface 246 of first inner flange 244 of nozzle section module 22 (FIG. 3).

Nozzle Course Module:

With reference to FIG. 3 there is illustrated an enlarged elevational partial cross-section of nozzle course module 22 of pressure vessel 10 showing the detailed structure of the vessel in the vicinity of one of the nozzles allowing access to the interior of pressure vessel 10.

Nozzle course module 22 comprises, basically, a first inner shell 224, corresponding to and aligned with first inner top head module shell 40, having a top rim 242 on which is attached, as by welding or the like, to nozzle module first inner top flange 244 having an upper bearing surface 246 and a lower bearing surface 248.

Upper bearing surface 246 of nozzle module first inner top flange 244 is adapted to sealably engage lower bearing surface 48 of first inner top head flange 44.

First inner shell 224 further includes a bottom rim 252 on which is attached, as by welding our the like, nozzle module first inner bottom flange 254 having a lower bearing surface 256 and an upper bearing surface 258.

Nozzle course module 22 further comprises a first intermediate shell 260, corresponding to and aligned with top head module first intermediate top shell 50, having a top rim 262 on which is attached, as by welding our the like, first intermediate top flange 264 having a upper bearing surface 266 and a lower bearing surface 268.

Upper bearing surface 266 of nozzle module first intermediate top flange 264 is adapted to sealably engage lower bearing surface 248 of first inner flange 244 using "O"-ring seal 270.

First intermediate shell 260 further includes a bottom rim 272 on which is attached, as by welding our the like, to nozzle module first intermediate bottom flange 274 having a lower bearing surface 276 and an upper bearing surface 278.

Lower bearing surface 276 of nozzle module first intermediate bottom flange 274 is adapted to sealably engage upper surface 258 of first inner flange 254 using "O"-ring seal 280.

A nozzle module first top bearing ring 286, segmented for easier removal, having an upper bearing surface 288 and a lower bearing surface 290 is placed between flanges 264 and 354 with upper bearing surface 288 adapted to sealably engage lower bearing surface 268 of first top intermediate flange 264. Upper and lower circumferential seals 292 and 294 maintain a leaktight seal between the flanges and the bearing ring surfaces.

A nozzle module first bottom bearing ring 300 having an upper bearing surface 302 and a lower bearing surface 304 is placed between flanges 274 and 370 with lower bearing surface 304 adapted to sealably engage upper bearing surface 278 of first intermediate bottom flange 274. Upper and lower circumferential seals 306 and 308 maintain a leaktight seal between the flange and bearing ring surfaces.

Nozzle course section 22 further comprises a second intermediate shell 350, corresponding to and aligned with second intermediate top head section shell 80, having a top rim 352 on which is attached, as by welding or the like, nozzle module second intermediate top flange 354 having a upper bearing surface 356 and a lower bearing surface 358.

Upper bearing surface 356 of nozzle module second intermediate top flange 354 is adapted to sealably engage lower bearing surface 290 of first upper bearing ring 286 using "O"-ring seal 294.

Second intermediate shell 350 further includes a bottom rim 368 on which is attached, as by welding our the like, nozzle module second intermediate bottom flange 370 having a lower bearing surface 372 and an upper bearing surface 374.

Lower bearing surface 372 of second intermediate flange 370 is adapted to sealably engage upper bearing surface 302 of first lower bearing ring 300 using "O"-ring seal 306.

A nozzle module second top bearing ring 386 having an upper bearing surface 388 and a lower bearing surface 390 is placed between flanges 354 and 424 with upper bearing surface 388 adapted to sealably engage lower bearing surface 358 of second upper intermediate flange 354. Upper and lower circumferential seals 392 and 394 maintain a leaktight seal between the flange and bearing ring surfaces.

A nozzle module second bottom bearing ring 400 having an upper bearing surface 402 and a lower bearing surface 404 is placed between flanges 370 and 430 with lower bearing surface 404 adapted to sealably engage upper bearing surface 374 of second lower intermediate flange 370. Upper and lower circumferential seals 408 and 406 maintain a leaktight seal between the flange and bearing ring surfaces.

Nozzle course module 22 further comprises a first outer shell 420, corresponding to and aligned with first outer shell 100 of top head module 20, having a top rim 422 which is attached, as by welding or the like, to nozzle module first top outer flange 424 having an upper bearing surface 426 and a lower bearing surface 428.

Upper bearing surface 426 of first top outer flange 424 is adapted to sealably engage lower bearing surface 390 of nozzle module second top bearing ring 386.

Upper bearing surface of first top outer flange 424 is adapted to sealably engage lower bearing surface 390 of top bearing ring 386 using "O"-ring seal 394.

First outer shell 420 further includes a bottom rim 432 which is attached, as by welding or the like, to first bottom outer flange 430 having an upper bearing surface 436 and a lower bearing surface 438.

Lower bearing surface 438 of first bottom outer flange 430 is adapted to sealably engage upper bearing surface 402 of third bottom bearing ring 400 using "O"-ring seal 408.

It will be noted that second intermediate shell 260 is spaced apart from third intermediate shell 350 to define a cavity 450 that can be filled with an insulating material 454, such as, fiberglass.

Similarly, third intermediate shell 350 is spaced apart from first outer shell 420 to define a cavity 452 which can be filled with a low melting point metal selected from the group consisting of lead, tin, bismuth or a combination of alloys of these metals as described and claimed in U.S. Pat. No. 4,767,593 and/or aluminum.

To gain access to the interior of pressure vessel 10, an inner nozzle conduit 460 is arranged to penetrate first inner shell 224 and first intermediate shell 260 and be attached thereto as by welding or the like, respectively, by welds 462 (to shell 224) and 464 (to shell 260).

An outer nozzle conduit 468 is disposed concentric with and spaced apart from inner nozzle conduit 460 having its inner end attached, as by weld 470 or the like, to second intermediate shell 350, spacer ring 466 encircling conduit 468 and first outer shell 420. An annular ring seal 472 is sealably attached to the outer end of both outer nozzle 468 and inner nozzle conduit 460.

It will be noted that cavity or space 474 between inner nozzle 460 and outer nozzle 468 is an extension of and in fluid communication with cavity or space 450 between first intermediate shell 260 and second intermediate shell 350. Cavity or space 474 can be filled with the same material used to file space 450, such as, an insulating material.

A nozzle section support flange 480 is attached to nozzle module 22, as by welding our the like, to top surface 436 of flange 430, the outer surface of shell 420 and lower surface 428 of flange 424. A flange bearing plate 482 is attached to the bottom of flange 480 and is adapted to engage or rest on pressure vessel support 14 which is embedded in the concrete of containment support wall 12. The vessel is supported at the heavy main nozzles in order to minimize the thermal motion of the connecting large main pipes.

Figure 4:
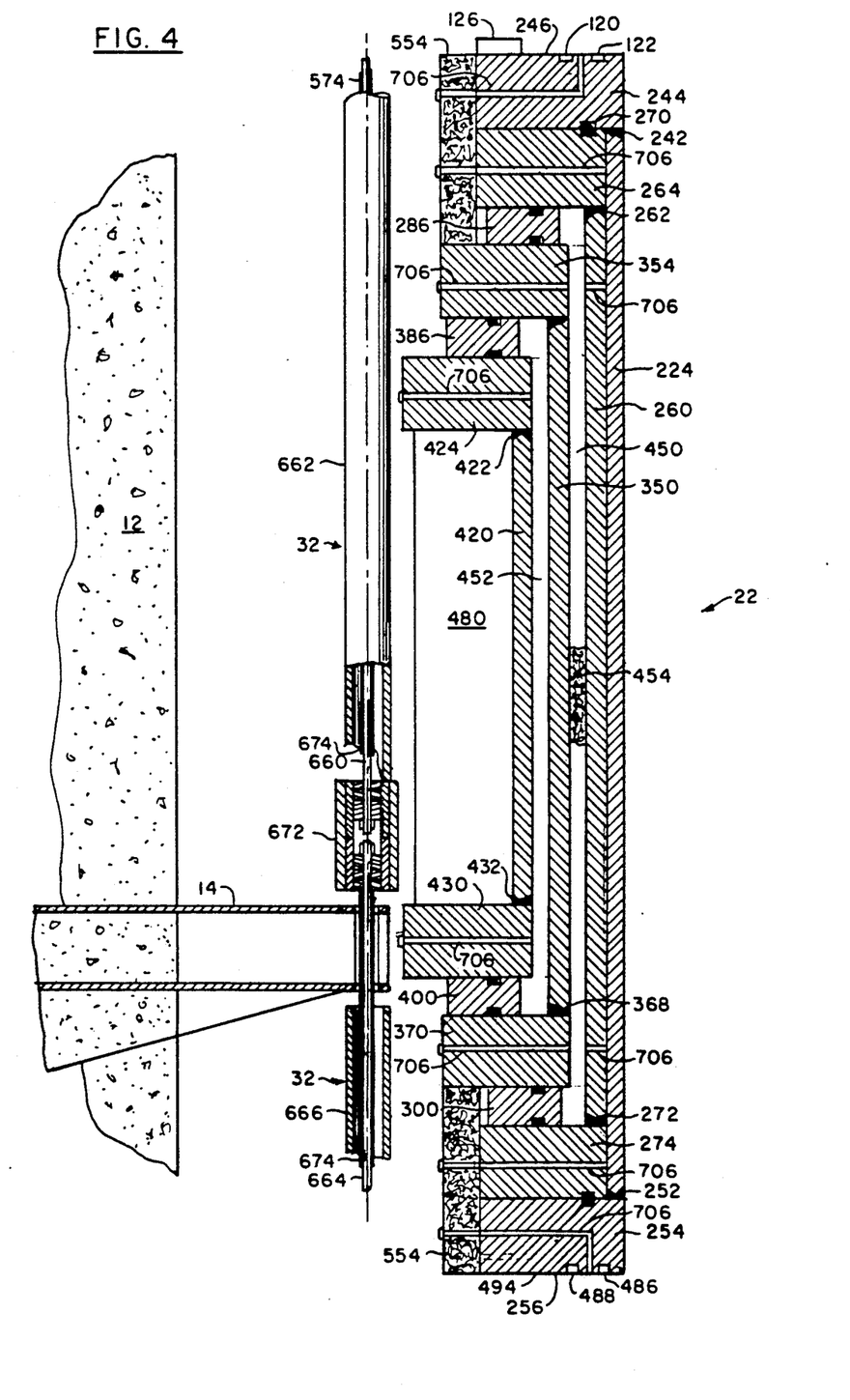
FIG. 4 is an elevational partial cross-section of the nozzle course module of the pressure vessel of FIG. 1 showing the shell layers without the nozzle penetration.

With respect to FIG. 4, there is illustrated an elevational partial cross section of nozzle course module 22 showing the shell layers without the nozzle penetration.

To obtain a leaktight seal between nozzle course module 22 and shell course module 24, a pair of first and second circumferential "O"-ring channels 486 and 488 are provided in lower bearing surface 256 of nozzle module first inner bottom flange 254. Matching "O"-ring channels 490 and 492 are provided in first inner top flange 504 of shell course module 24 (FIG. 5).

Figure 5:
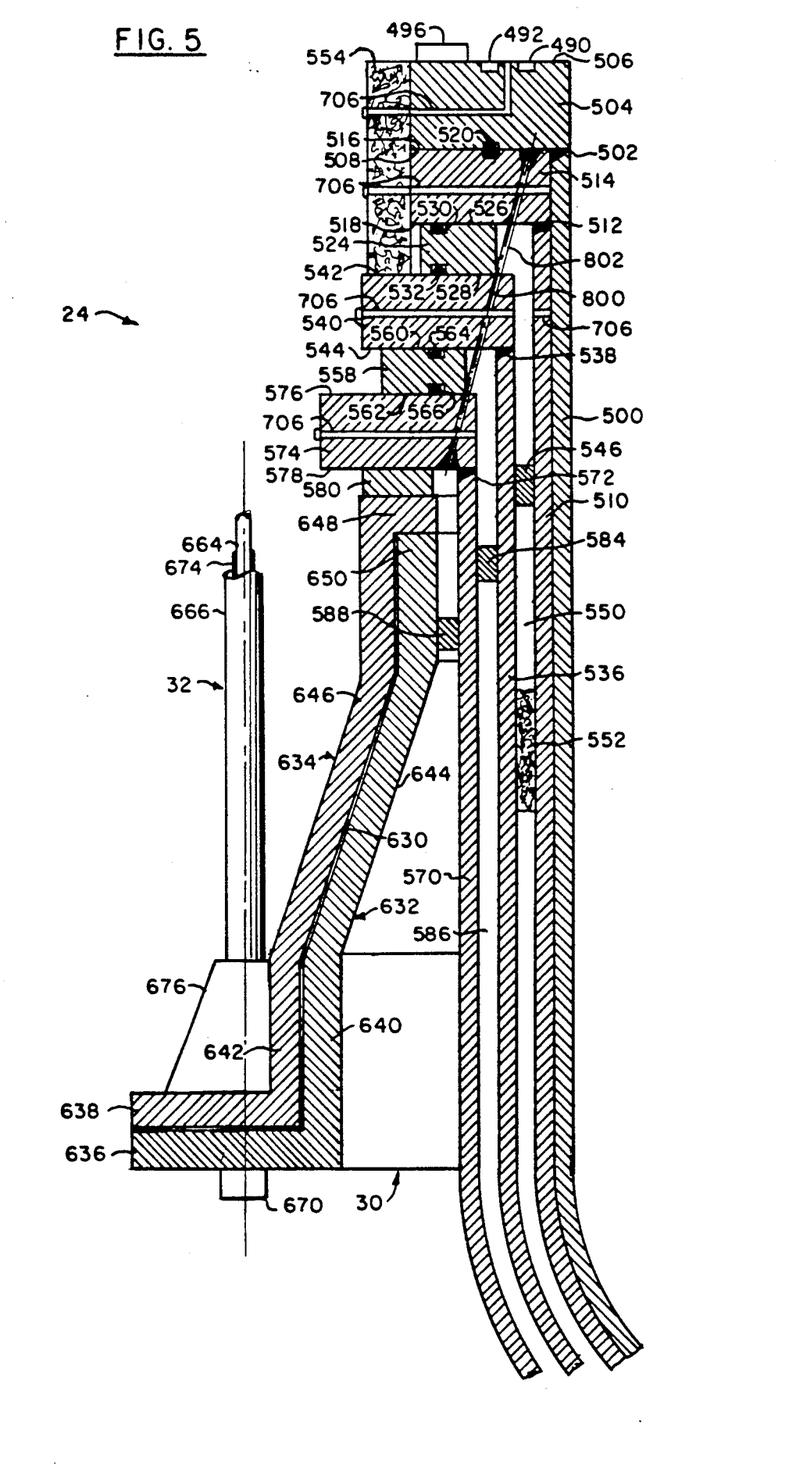
FIG. 5 is an elevational partial cross-section of the shell course module of the pressure vessel of FIG. 1.

In order to properly align nozzle course module 22 with shell course module 24, a radial guide notch 494 is provided in lower bearing surface 256 of nozzle course first inner bottom flange 254, which engages radial guide 496 attached to top surface 506 of shell course module first inner top flange 504 (FIG. 5).

Shell Course Module:

With reference to FIG. 5, there is illustrated an elevational partial cross section of shell course module 24 showing the shell and flange structure in greater detail.

Shell course module 24 comprises, basically, a first inner shell 510 having a top rim 502 on which is attached, as by welding or the like, first inner top flange 504 having an upper bearing surface 506 and a lower bearing surface 508.

Shell course module 24 further comprises a first intermediate shell 510 having a top rim 512 on which is attached, as be welding or the like, first intermediate flange 514 having an upper bearing surface 516 and a lower bearing surface 518. Upper bearing surface 516 of first intermediate flange 514 is adapted to sealably engage lower bearing surface 508 of first inner top flange 504 using "O"-ring seal 520.

A shell module first spacer bearing ring 524 having an upper bearing surface 526 and a lower bearing surface 528 is placed between first intermediate flange 514 and second intermediate flange 540 and is adapted to sealably engage bottom bearing surface 518 of first intermediate flange 514. Upper and lower circumferential seals 530 and 532 maintain a leaktight seal between the flanges and bearing ring surfaces Bottom shell course module 24 further comprises a second intermediate shell 536 having a top rim 538 on which is attached, as by welding or the like, second intermediate flange 540 having an upper bearing surface 542 and a lower bearing surface 544. Upper bearing surface 542 of second intermediate flange 540 is adapted to sealably engage lower bearing surface 528 of first bearing ring 524.

Between first intermediate shell 510 and second intermediate shell 536 is radial spacer bearing plate 546 for maintaining radial spacing of shells 510 and 536 to define first intermediate space or cavity 550. This space is filled with a high temperature insulating material 552, such as, fiberglass or the like. Space 550 could also be filled with a fluid.

A shell module second spacer bearing ring 558 having an upper bearing surface 560 and a lower bearing surface 562, is adapted to sealable engage lower bearing surface 544 of second intermediate flange 540. Upper and lower circumferential seals 564 and 566 in spacer ring 558 maintain leaktight seal between the flange and bearing ring surfaces.

Shell course module 24 further comprises a first outer shell 570 having a top rim 572 on which is attached, as by welding or the like, first outer flange 574 having an upper bearing surface 576 and a lower bearing surface 578. Upper bearing surface 576 of first outer flange 574 is adapted to sealably engage lower bearing surface 562 of bearing ring 558. Lower bearing surface 578 of first outer flange 574 is adapted to engage bearing plate 580. Bearing plate 580, in turn, is adapted to engage bottom flange 648 of tendon skirt 30.

Between first outer shell 570 and second intermediate shell 536 is second radial spacer bearing plate or ring 584 defining space or cavity 586. Space 586 can be filled with a fluid, such as, a low melting point metal in order to transmit pressure between shells 536 and 570 and also provide good bonding so that the outer vessel shells can be cooled from outside and thus carry larger pressure loads.

Figure 6A:
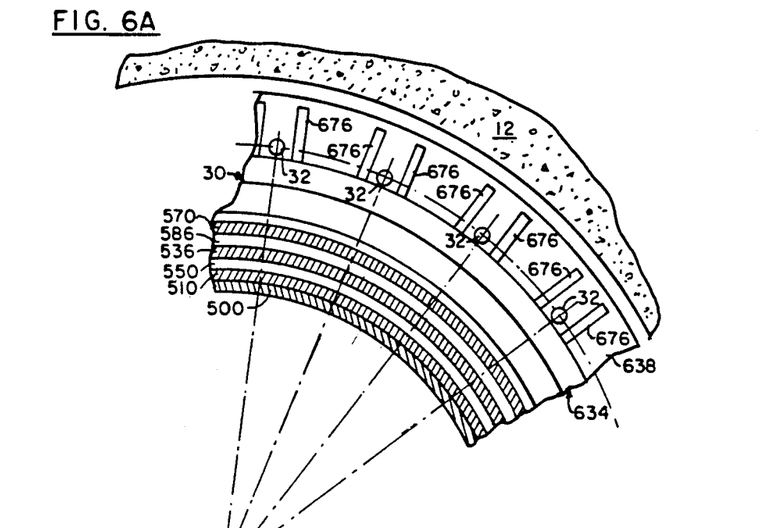
FIG. 6A is the lower portion of a horizontal cross section of the pressure vessel of FIG. 1 taken at lines 6—6.
Figure 6B:
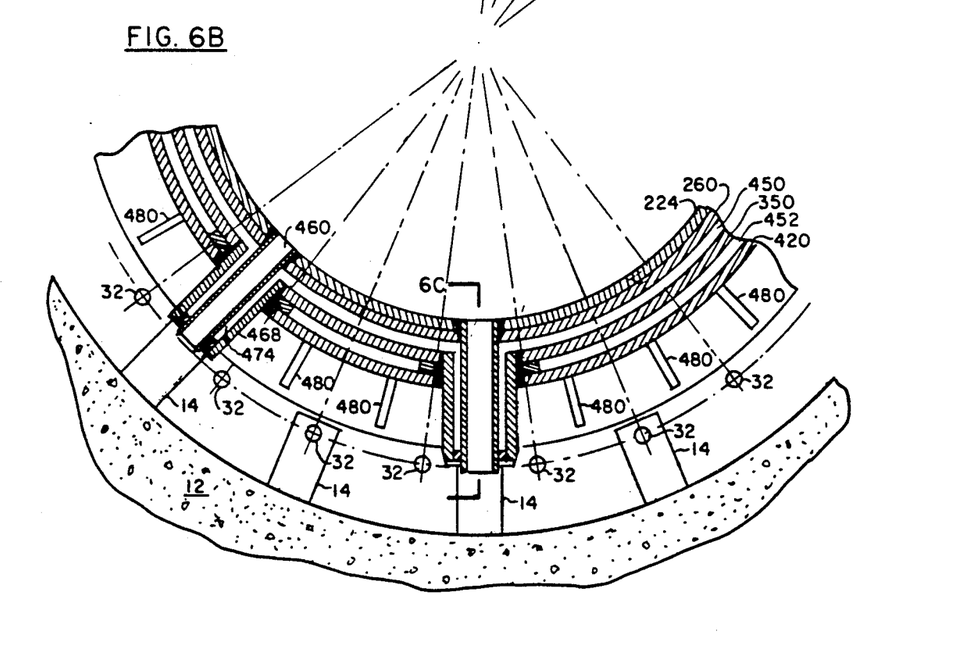
FIG. 6B is the upper portion of a horizontal cross section of the pressure vessel of FIG. 1 taken at lines 6—6.

With reference to FIGS. 6A and 6B, there is illustrated an horizontal cross-section of pressure vessel 10 taken at lines 6—6 of FIG. 1.

This cross-section is first taken through the middle of nozzle section module 22 to the centerline of pressure vessel 10 (FIG. 6B) and then jogs down to a plane just above bottom tendon skirt 30 (FIG. 6A).

With respect to FIG. 6A, tension or tendon members 32 are shown protected in each side by reinforcing flanges 676 attached to bottom flange 638 of outer tendon skirt 634 as by welding or the like.

Figure 6C:
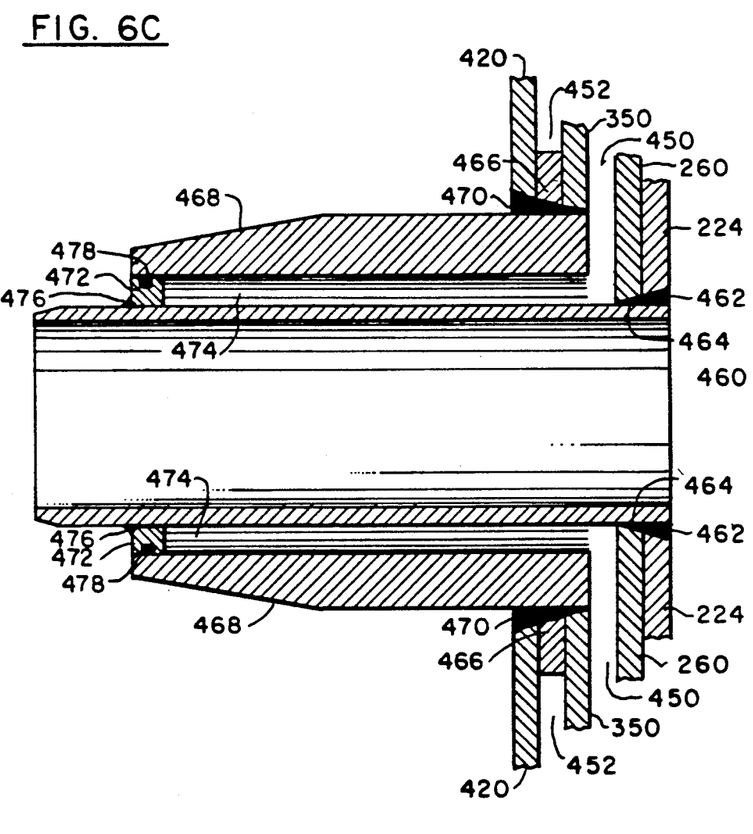
FIG. 6C is an enlarged section of the nozzle of FIG. 6B taken at lines 6C—6C.

With reference to FIG. 6C, there is illustrated an enlarged view of the nozzle penetration taken at line 6C—6C of FIG. 6B. It will be noted that annular ring seal 472 is attached to inner nozzle conduit 472 by weld 476. Annular ring seal 472 in not attached to outer conduit 468 but is provided with an O-ring seal 478 to maintain a leaktight condition.

Figure 7:
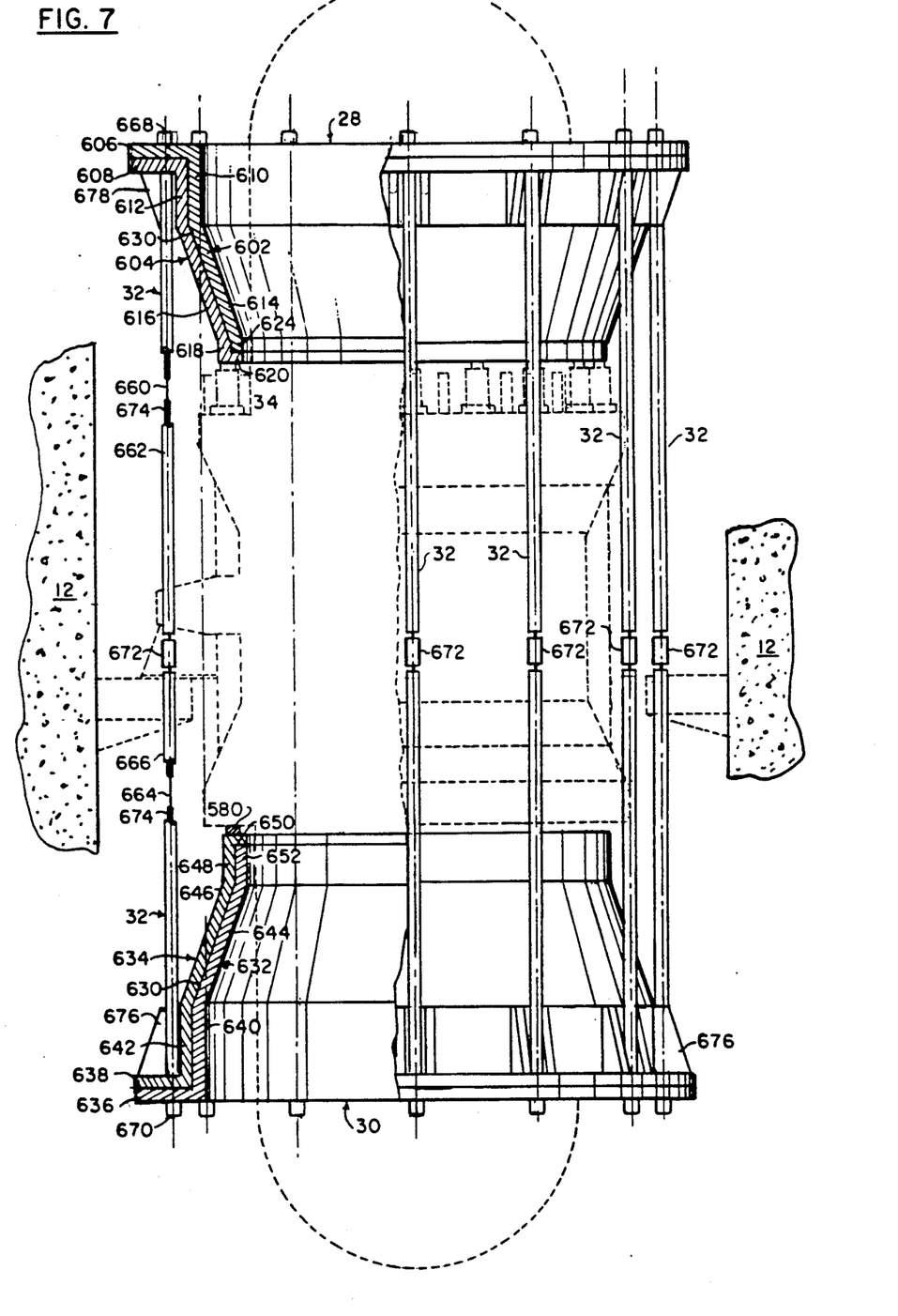
FIG. 7 is an elevational partial cross-section of the multiple shell pressure vessel of the present invention illustrating the tendon skirt configuration.

Tendon Cage:

With reference to FIG. 7 there is illustrated an elevational partial cross-section of multiple shell pressure vessel 10 in phantom dashed lines to more clearly show the configuration of the tendon cage which comprises upper skirt 28, lower skirt 30 and tendons 32.

Upper tendon skirt 28 comprises a first and second layer of inner and outer tendon skirts 602 and 604, respectively, between which is a bond breaker 630, such as, aluminum foil. Inner and outer tendon skirts 602 and 604, comprise, respectively, first and second top flanges 606 and 608, first and second top rims 610 and 612, and first and second conical sides 614 and 616. Outer tendon skirt 604 is provided with a second bottom rim 618 having an integrally connected inwardly projecting bottom flange 620 having an upper surface adapted to engage first bottom rim 624 of inner tendon skirt 602.

The bottom surface of flange 620 is adapted to engage the top of hydraulic rams or screw jacks 34.

In a similar manner, bottom tendon skirt 30 comprises a pair of inner and outer bottom tendon skirts 632 and 634 comprising, respectively, first and second bottom flanges 636 and 638, first and second bottom rims 640 and 642, and first and second conical sides 644 and 646. A bond breaker 630, such as, aluminum foil, is disposed between skirts 632 and 634. Outer tendon skirt 634 is provided with a second top rim 648 having an integrally connected inwardly projecting top flange 650 adapted to engage the upper lip of rim 652 of inner tendon skirt 632. The upper surface of top flange 650 is adapted to engage bearing ring 580 (FIG. 5) which, in turn engages and bears against the lower bearing surface 578 (FIG. 5) of first outer flange 574 of shell course module 24.

Upper tendon skirt 28 is connected to lower tendon skirt 30 by a plurality of tension or tendon members 32 comprising an upper tension cable 660 with corrosion insulation 674 contained in an upper insulating sleeve 662 and a lower tension cable 664 with corrosion insulation 674 contained in a lower insulating sleeve 666. A top tension member anchor 668 connects upper tension cable 660 to upper tendon skirt 28 while a bottom tension member anchor 670 connects lower tension cable 664 to lower tendon skirt 30. A tendon coupling 672 is used to connect upper tension cable 660 to lower tension cable 664. Tension cable coupling 672 is shown in greater detail in FIG. 4.

It can be seen that by actuating hydraulic or screw jacks 34, tendon skirt 28 will travel upwardly and cause upper and lower tension cables 666 and 664 to be placed in tension resulting in top head module 20, nozzle section module 22 and shell course module 24 being placed in compression. In such compression, all bearing surfaces of flanges and spacer rings in those modules will be placed in compression and thus form a compression seal with each other.

By using such a system, it can be seen that dismantling the vessel for inspection is greatly simplified.

Flange Geometry:

While vessel 10 is under pressure, caused by tension cables 660 and 664 being placed under tension, combined with the vessel service pressure, all of the various spacer rings and flanges of modules 20, 22 and 24 that are maintained under pressure may have a tendency to warp or twist and cause additional unwanted torsional forces on the various pressure vessel shells and their corresponding flanges which may be sufficient to break or seriously weaken the various pressure seals.

These torsional forces can be neutralized by a special geometric configuration of the flanges and spacer rings.

Figure 8:
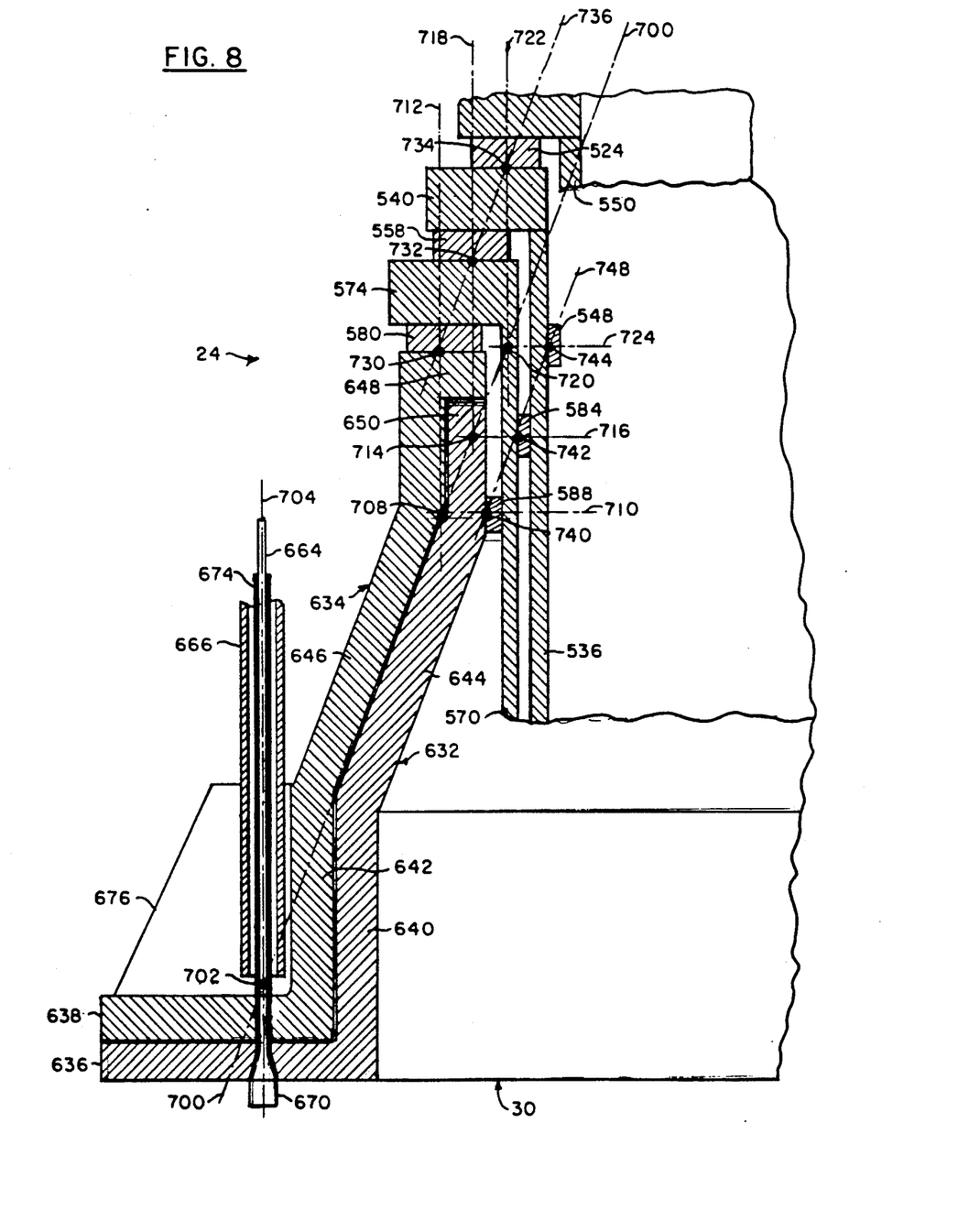
FIG. 8 is an enlarged elevational partial cross-section of the shell course module of the pressure vessel of FIG. 1 showing the relationship between the tendon skirt, shell flanges, the vertical and radial bearing plates to eliminate torsional forces on the flanges.

With reference to FIG. 8, there is illustrated an enlarged partial cross-section of the shell course module 24 of pressure vessel 10 showing the relationship between the tendon skirt, shell flanges and radial bearing plates to eliminate torsional forces on the flanges. For the purpose of simplifying the illustration, the cross-section shows only the first outer and second intermediate shell configurations.

In the preferred configuration of FIG. 8, line 700 is located at the middle surface or centroid of tendon skirts 632 and 634.

Point 702 defines the intersection between the centerline 704 of tension cable 664 and line 700 through the middle surface or centroid of skirts 632 and 634. Point 708 is the intersection point of horizontal line 710 through outer radial bearing plate 588 and vertical line 712 which pass through the center of vertical spacer bearing plate 580

Point 708 must be located on line 700 in order to result in zero torsion of the skirts.

Radial spacers 588, 584 and 548 must be located so as to result in zero or minimum torsion of the shell flanges. The exact position can be calculated.

For Example, consider a vessel consisting of "n" shell-layers.

Figure 10A:
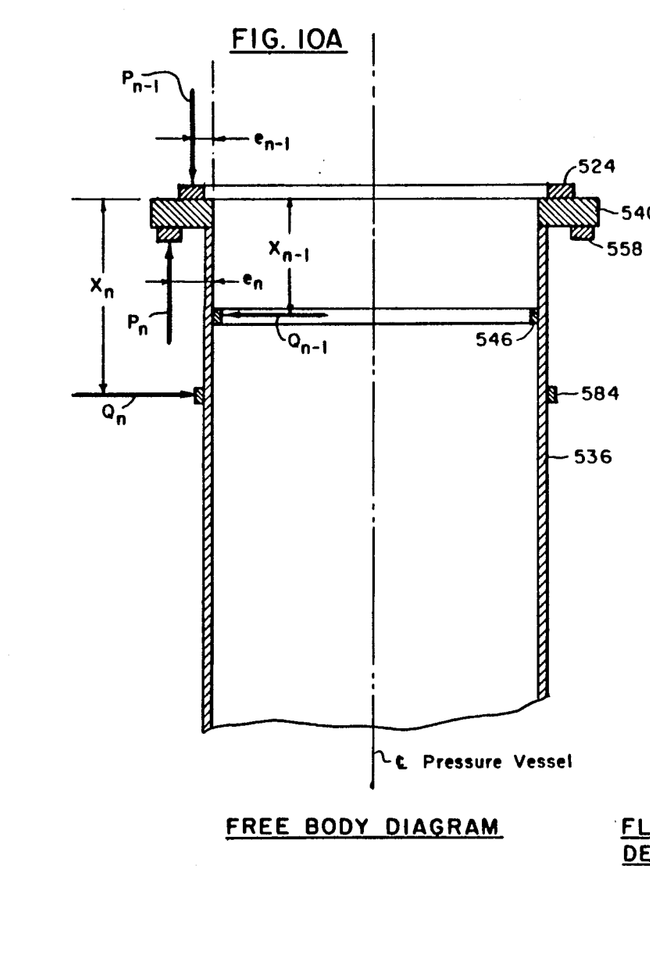
FIGS. 10A, 10B, 10C and 10D illustrate the torsional forces on the shell flanges that are reduced or eliminated depending upon the location of the radial bearing rings or plates.

Then, with respect to FIG. 10A, consider the "free body" of the nth shell-layer with its vertical and radial bearing rings subjected to the vertical reactions $P_n$ and $P_{n-1}$ and radial reactions $Q_n$ and $Q_{n-1}$.

Figure 10B:
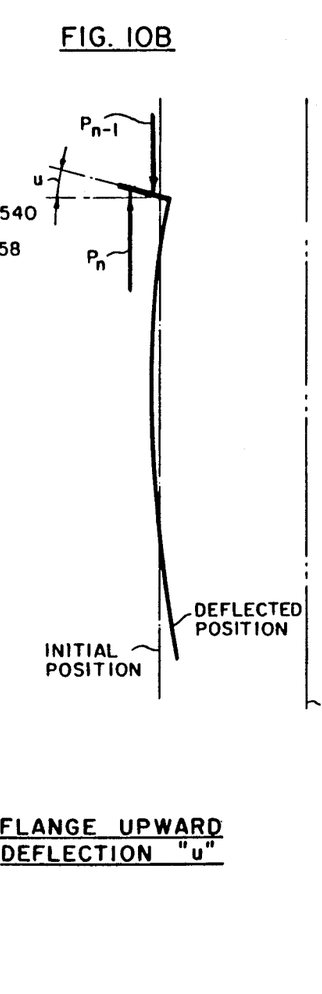

The vertical reactions are known, they will cause the flange to deflect an angle "u" upward, as shown in FIG. 10B.

Figure 10C:
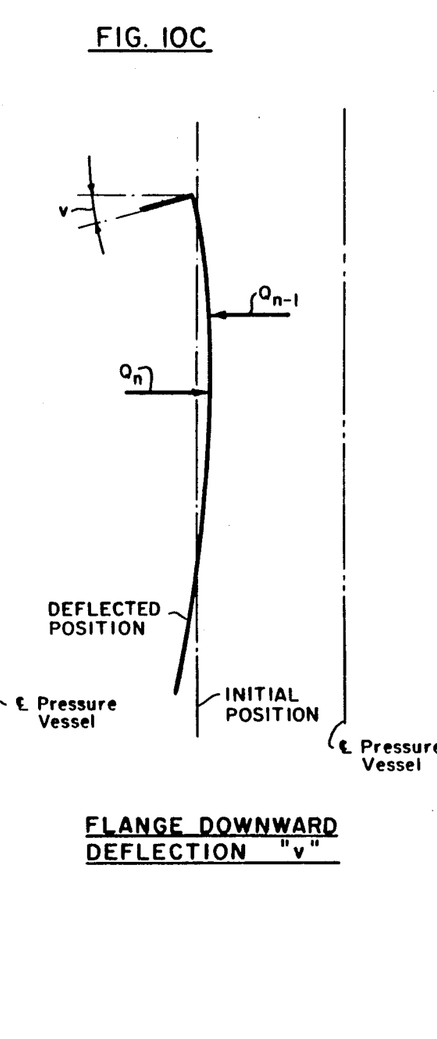

The horizontal reactions are also known, they will cause the flange to deflect an angle "v" downward, as shown in FIG. 10C.

Therefore, in order to reduce or eliminate the flange "rotation", "u" should equal "v" or $$u - v = 0 \qquad \text{(Equation 1)}$$

or as close to zero as possible.

Now, since reactions $P_n$, $P_{n-1}$, $Q_n$, and $Q_{n-1}$ are given for a given vessel pressure, and the locations of reactions $P_n$ and $P_{n-1}$ is also given: $e_n$, and $e_{n-1}$, and the location of $X_{n-1}$ of radial reaction $Q_{n-1}$ is known also; then the only unknown value is $X_n$, which is the location or vertical distance from rim to center of bearing ring.

Figure 10D:
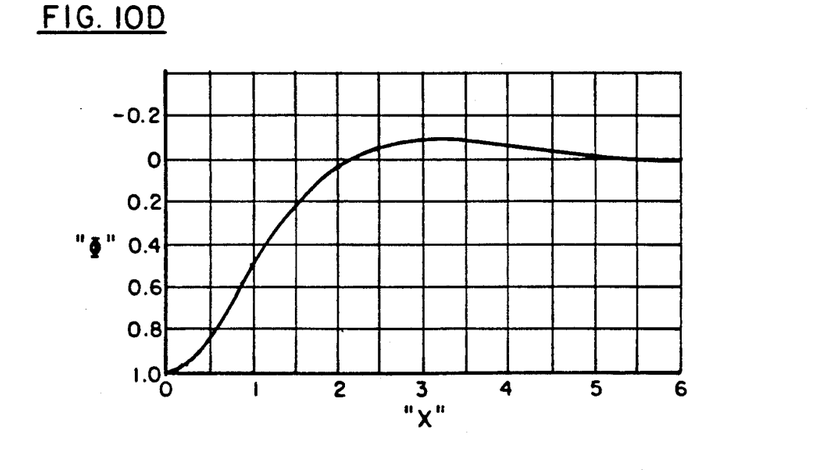

Now, this unknown $X_n$ can be uniquely determined from Equation 1 since we know that $$u = f[P_n e_n - P_{n-1} e_{n-1}] \qquad \text{(Equation 2)}$$

and $$v = g[Q_n \Phi(x_n) - Q_{n-1} \Phi(x_{n-1})] \qquad \text{(Equation 3)}$$

where "f" and "g" are known coefficients and "Φ" (Phi) is a function given in the well know reference "Theory of Plates and Shells", S. Timoshenko, McGraw-Hill Book Company, 1959. The function Φ (Phi) relates angular displacement "v" of the flange to vertical distance "x", or location of the radial spacer bearing ring from the top of the vessel shell The function "Φ" (Phi) used in the present example is a simplified version of the function given in the above reference. A plot of function "Φ" (Phi) versus "x" is shown in FIG. 10D.

Coefficients "f" and "g" and function "Φ" (Phi) depend on known values: Shell radius, shell thickness, modulus of elasticity and Poisson's ratio only.

Therefore, by inserting the expressions (2) for "u" and (3) for "v" into Equation (1), it can be seen that the one and only unknown $X_n$, that is, the location of radial bearing "n" can be determined.

Radial bearing plates or spacer rings 588, 584 and 548 are located as calculated so that the flange and skirts will be loaded at their centroid, so they will not twist.

Figure 9:
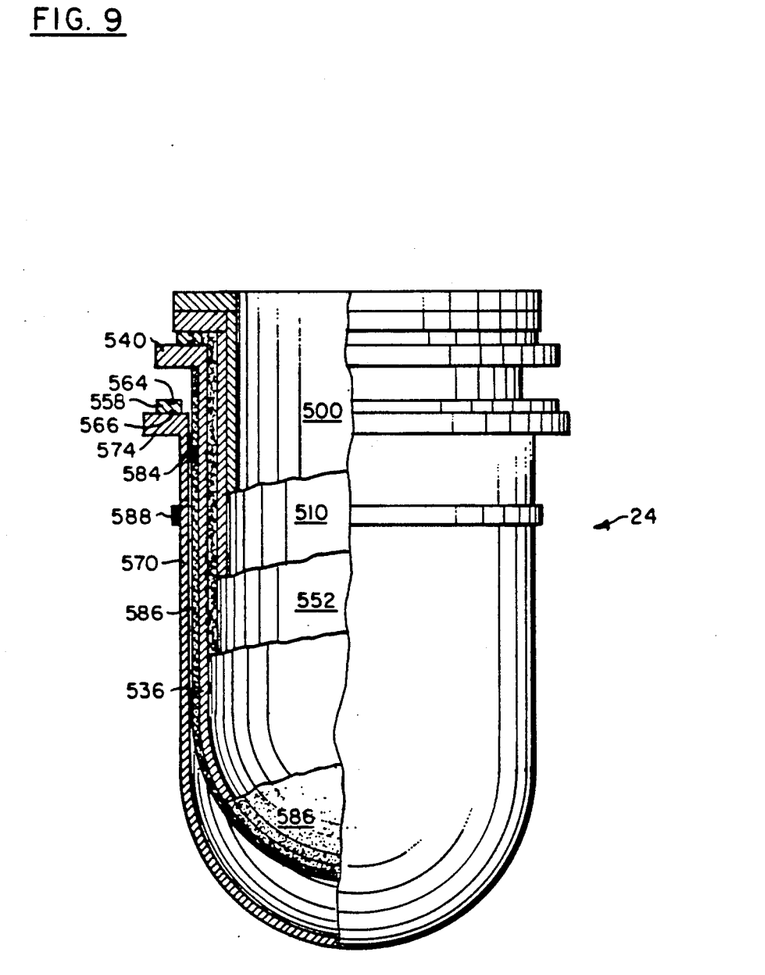
FIG. 9 is an elevational partial cross section of the shell course module of the pressure vessel illustrating the method of assembly.

Assembly Method:

With reference to FIG. 9, there is illustrated a partial elevational cross-section of pressure vessel 10 showing how the individual pressure vessel shells are assembled.

The assembly method is best illustrated by shell module 24 shown in exploded view in FIG. 9.

A typical step in the step by step assembly of the vessel shell course is illustrated in FIG. 9.

Prior to this step, a "package" consisting of shells 500, 510, insulation shell 552, and shell 536 with radial guide 584 welded to the outside thereof, has already been assembled. Then filler material (a solid at room temperature) in the form of sheets or a preformed shell 586 is attached to the exterior of shell 536.

The filler material 586 can be a low melting point metal layered in sheets using shell 536 as a form or mold.

The weight of this filler shell has been calculated, or determined so that, when the vessel is in operation, the (hot) filler will exert a given pressure onto the adjacent shells 536 and 570 so that these shells will carry exactly their calculated optimum pressure load. The next shell layer 570 with radial guide 588 and flange 574 welded onto it and the vertical shell module second spacer bearing ring 558 with seals 564, 566 positioned on it, is nested or telescoped on the already assembled package.

There may be sufficient clearance between the inside of shell 570 and the outside of filler shell 586 when they are nested "cold". If not, shell 570 must be heated, causing it to expand, before it can be telescoped onto the already assembled package.

With reference to FIG. 5, when all shells 500 to 570 have been assembled, then wire strands 802 are tightened and anchored at the bottom of flange 574.

The finished module may be heated and vibrated in order to melt the fillers and get rid of air pockets. Additional filler may be let in and/or air let out through vent conduits or ducts 706 (FIG. 5).

The finished module 24 is placed on bearing plate 580 which will be used to support the weight of all the pressure vessel shells and modules.

A conduit 800 is provided at circumferential intervals in flanges 514, 540 and 574, which contain prestressing wire strands 802 that tie the shell layers together into a complete shell-course module 24.

When the "nesting" is completed, the shells are then tied together by tightening the prestressing wires 802 and anchoring them at the base of flange 574. Then leaktight seals 490, 492 are provided at the top of module 24 where it interfaces with module 22.

Later, all the modules are compressed together using upper and lower tendon skirts 28 and 30, and all the tendons 32 are tensioned, thus a leaktight seal is provided between all pressure vessel shells. Then the tendon sleeves 662 and 666 may be heated and corrosion insulation 674 (for example, in the form of a lead-tin alloy) may be introduced into sleeves 662 and 666.

Since the pressure vessel shells are not attached to each other by bolts, welding or the like, it can be seen that pressure vessel module 24 can be readily disassembled and the telescoping shells removed from each other for inspection and repair of all welds and various portions of the vessel shells.

The other modules are assembled in a similar way and placed on lower tendon skirt 30, on top of each other. Then top skirt 28 is put on top of modules 20 and all tendons are installed.

Then, by tensioning all the tendons attached to upper and lower tendon skirts 28 and 30, a leaktight seal is provided between pressure vessel modules 20, 22 and 24.

A radial band of insulating material 554 is provided about the periphery of flanges 44, 54, 244, 264, 504, and 514 to reduce heat losses and prevent overheating of tendons 34.

Leak Detection System:

to monitor for leaks, a plurality of leak detection conduits 706 are provided and disposed radially through the flanges. The conduits can be either capped and used intermittently for leak detection or they can be connected into a leak detection system through an additional conduit system (not shown) well known in the art.

In certain circumstances, a few of the leak detection conduits can also be used, where they communicate with the spaces between shells, to act as filler conduits for fluids, such as a low melting point metal, that may be placed between shells as disclosed in U.S. Pat. No. 4,767,593.

Testing:

Prior to service, the vessel is tested by being brought up to operating pressure and temperature conditions or higher.

Permanent strain gages which are attached to all critical points of each shell are continuously monitored. If shell strains substantially different from desired (or pre-calculated) values are found, then additional filler material may be pumped in and/or bled off from the shell interspaces, and tendons tightened or loosened by adjusting the ram positions, until the desired stress levels are obtained.

Operation:

For the present invention, the insulation is located inside the vessel or in the wall. In the present embodiment, the insulation is shown between the first and second intermediate shells and is thus protected from the fluid container in the vessel.

The outer vessel shell layers, located exterior to the insulation layer, can be kept cool by cooling the outside surface of the vessel. This is due to the thermal bonding which exists between the steel shells and the metallic filler materials.

Thus the vessel shells located outside or exterior to the insulating layer can carry a large pressure load because they are kept full.

We claim:

1. A multiple shell pressure vessel comprising
   a top head section comprising
   a top head flange having a lower bearing surface,
   a shell course section comprising
   a first inner shell having a top rim,
   a first inner shell flange attached to said top rim of said first inner shell and having a lower bearing surface and an upper bearing surface,
   means for sealably connecting said upper bearing surface of said first inner flange to said lower bearing surface of said top head flange,
   a second outer shell adapted to telescopically enclose said first inner shell and having a top rim,
   a second outer shell flange attached to said top rim of said second outer shell and having a lower bearing surface and an upper bearing surface,
   means for sealably connecting said upper bearing surface of said second outer shell flange to said lower bearing surface of said first flange,
   a top tendon skirt having a bottom flange,
   means for connecting said bottom flange to said top head section proximate said top head flange,
   a bottom tendon skirt having a top flange, means for connecting said top flange to said second outer shell proximate said lower bearing surface of said second flange, means connected to said top and bottom tendon skirts for compressing said flanges between said top and bottom tendon skirts, and a radial spacer bearing ring disposed about the outer surface of said shell module first inner shell and adapted to engage the inner surface of said shell module second outer shell, said radial spacer bearing ring located a predetermined distance from said first inner shell flange to equalize torsional forces on said first inner shell flange.

2. A multiple shell pressure vessel comprising a top head module comprising a top head flange having a lower bearing surface, a shell course module comprising a first inner shell having a top rim, a first inner shell flange attached to said top rim of said first inner shell and having a lower bearing surface and an upper bearing surface, means for sealably connecting said upper bearing surface of said first inner flange to said lower bearing surface of said top head flange, an intermediate shell adapted to telescopically enclose said first inner shell and be spaced apart therefrom comprising a top rim, an intermediate shell flange attached to said top rim and having a lower bearing surface and an upper bearing surface, means for sealably connecting said upper bearing surface of said intermediate flange to said lower bearing surface of said first inner shell flange, an outer shell adapted to telescopically enclose said intermediate shell and be spaced apart therefrom comprising a top rim, an outer shell flange attached to said outer shell top rim and having a lower bearing surface and an upper bearing surface, means for sealably connecting said upper bearing surface of said outer shell flange to said lower bearing surface of said intermediate shell flange, a top tendon skirt having a bottom flange, means for connecting said bottom flange to said top head module proximate said upper bearing surface of said top head flange, a bottom tendon skirt having a top flange, means for connecting said top flange to said outer shell proximate said lower bearing surface of said outer shell flange, and means connected to said top and bottom tendon skirts for compressing said flanges between said top and bottom tendon skirts.

3. A multiple shell pressure vessel as claimed in claim 2 further comprising an insulating material disposed in the space between said first inner shell and said intermediate shell, and a low melting point thermal conducting material disposed in the space between said outer shell and said intermediate shell.

4. The multiple shell pressure vessel as claimed in claim 2 further comprising a first radial spacer bearing ring disposed about the outer surface of said shell module first inner shell and adapted to engage the inner surface of said shell module intermediate shell, said first radial spacer bearing ring located a predetermined distance from said first inner shell flange to equalize torsional forces on said first inner flange, and a second radial spacer bearing ring disposed about the outer surface of said shell module intermediate shell and adapted to engage the inner surface of said shell module outer shell, said radial spacer bearing ring located a predetermined distance from said intermediate shell flange to equalize torsional forces on said intermediate flange.

5. The multiple shell pressure vessel as claimed in claim 2 further comprising means for cooling the outer shell of said pressure vessel.

6. The multiple shell pressure vessel as claimed on claim 2 further comprising means for controlling the pressure of said low melting point thermal conducting material disposed in the space between said outer shell and said intermediate shell.

7. A multiple shell pressure vessel comprising a top head section comprising a top head bottom rim, a top head flange attached to said bottom rim of said top head section, said top head flange having an upper bearing surface and a lower bearing surface, a nozzle course section comprising a nozzle course top rim, a nozzle course top flange attached to said nozzle course top rim and having a top bearing surface and a lower bearing surface, means for sealably connecting said upper bearing surface of said nozzle course top flange to said lower bearing surface of said top head flange, a nozzle course bottom rim, a nozzle course bottom flange attached to said nozzle course bottom rim and having an upper bearing surface and a lower bearing surface, a shell course section comprising a first inner shell having a top rim, a first flange attached to said top rim of said first inner shell and having a lower bearing surface and an upper bearing surface, means for sealably connecting said upper bearing surface of said first flange to said lower bearing surface of said nozzle course bottom flange, a second outer shell adapted to telescopically enclose said first inner shell and having a top rim, a second flange attached to said top rim of said second outer shell and having a lower bearing surface and an upper bearing surface, means for sealably connecting said upper bearing surface of said second flange to said lower bearing surface of said first flange, a top tendon skirt having a bottom flange, means for connecting said bottom flange to said top head section proximate said upper bearing surface of said top head flange, a bottom tendon skirt having a top flange, means for connecting said top flange to said second outer shell proximate said lower bearing surface of said second flange, and means connected to said top and bottom tendon skirts for compressing said flanges between said top and bottom tendon skirts.

8. The multiple shell pressure vessel as claimed in claim 7 further comprising a first shell course bearing plate disposed between the lower bearing surface of said first inner shell flange and the upper bearing surface of said second outer shell flange.

9. The multiple shell pressure vessel as claimed in claim 7 wherein said top tendon skirt comprises
a top tendon skirt top flange
a top tendon skirt frusto-conical section disposed between said top tendon skirt bottom flange and said top tendon skirt top flange, and
said bottom tendon skirt comprises
a bottom tendon skirt bottom flange,
a bottom tendon skirt frusto-conical section disposed between said bottom tendon skirt top flange and said bottom tendon skirt bottom flange.

10. The multiple shell pressure vessel as claimed in claim 9 comprising
at least three tension members connected between said top tendon skirt top flange and said bottom tendon skirt bottom flange and equiangularly spaced around said flanges outside said pressure vessel,
said first and second shell course flanges stepped relative to each other, and
a radial spacer bearing ring disposed between said first inner and said second outer shells of said shell course and located proximate a force line which produces zero flange torsion.

11. The multiple shell pressure vessel as claimed in claim 10 wherein
the point of connection of said tension members to said top tendon skirt top flange and said bottom tendon skirt bottom flange are approximately coincident with the frusto-conical surface defined by said top tendon skirt frusto-conical section and said bottom tendon skirt frusto-conical section.

* * * * *